United States Patent [19]
Buda

[11] 4,146,252
[45] Mar. 27, 1979

[54] PIPE COUPLING ARRANGEMENT

[75] Inventor: Salvatore Buda, East Hills, N.Y.

[73] Assignee: Berger Industries, Inc., Maspeth, N.Y.

[21] Appl. No.: 869,433

[22] Filed: Jan. 16, 1978

[51] Int. Cl.² ............................................ F16L 21/00
[52] U.S. Cl. .................... 285/308; 285/305; 285/369
[58] Field of Search .............. 285/305, 310, 340, 178, 285/308, 369

[56] References Cited

U.S. PATENT DOCUMENTS

| | | | |
|---|---|---|---|
| 2,005,174 | 6/1935 | Williams | 285/305 X |
| 3,334,929 | 8/1967 | Wiltse | 285/305 |
| 3,432,189 | 3/1969 | Buller | 285/340 X |
| 3,704,034 | 11/1972 | Shire et al. | 285/178 X |

*Primary Examiner*—Thomas F. Callaghan
*Attorney, Agent, or Firm*—Kirschstein, Kirschstein, Ottinger & Cobrin

[57] ABSTRACT

A coupling sleeve surrounds two adjacent pipe ends to be coupled together. A continuously-converging, spiral-shaped channel is provided at opposite end regions of the sleeve. A continuously-converging spiral-shaped split constrictable member is located in and angularly movable through each channel. Actuating members in force-transmitting relationship with each trailing end region of a respective constrictable member are operative for angularly moving the latter through each channel, and for radially constricting each constrictable member about and in sealing engagement with the entire periphery of each respective pipe end. In the fully clamped position, each leading end region is overlapped by each respective trailing end region. The spiral-shaped channel is formed in one embodiment by spiral-shaped walls of the sleeve itself, or in another embodiment by a spiral-shaped insert which is received in a circular groove formed by circular-shaped walls of the sleeve.

16 Claims, 8 Drawing Figures

PIPE COUPLING ARRANGEMENT

BACKGROUND OF THE INVENTION

1. Field of the Invention

The present invention relates generally to pipe coupling arrangements and, more particularly, to an arrangement for connecting two adjacent tubular pipe ends in sealing relationship with each other.

2. Description of the Prior Art

Many types of pipe coupling arrangements have been proposed in the art. For example, a coupling sleeve having threaded ends surrounds and threadedly engages cooperating threaded ends of two adjacent pipes. It has also been proposed to enlarge one pipe end to form a bell, and thereupon to jam the other end into the bell to form a joint.

As the use of pipes proliferated, it became desirable to have a better method of joining pipes. One of these methods involved the flanging of a pipe end and the squeezing of the flange between two parts of a fitting or coupling. The threading method, the belling and the flanging methods involved considerable expense and took a considerable amount of time.

According to one proposed version, each pipe end has an enlarged annular threaded cap, and a ring surrounds each pipe end intermediate the latter and the cap. A coupling sleeve having opposite threaded ends threadedly engages the threads of the caps. When the caps were tightened, they constricted the rings.

This type of compression coupling was satisfactory so far as its functioning went. The unsatisfactory part of it was the cost of the compression coupling, i.e., the cost to manufacture it. The caps had to be either machined or forged. Both of these processes were quite slow. Production of the caps was quite limited. Also there were four threading operations, one on each cap and one on each end of the coupling sleeve. These were expensive machining operations.

According to another proposed version, a sleeve surrounds each pipe end and forms clearances with the latter. A short wedge is thereupon jammed into each clearance to wedge the pipe end against the sleeve. However, this type of coupling is not altogether satisfactory in making a tight and reliable clamping seal, because the short wedge does not sealingly engage the entire outer periphery of the respective pipe end. Moreover, since this wedge only engages a short circumferential portion of the respective pipe end, the walls of the pipe ends tend to be stressed and deformed as the wedge is progressively jammed into its clearance. Such deformation of the pipes is undesirable because the resulting constriction prevents free flow through the pipeline.

SUMMARY OF THE INVENTION

1. Objects of the Invention

Accordingly, it is the general object of the present invention to overcome the above-cited drawbacks of the prior art.

It is a further object of the present invention to provide a reliable and inexpensive compression coupling.

It is still another object of the present invention to eliminate the use of threaded connections on a coupling sleeve and on the pipe ends of two pipes to be interconnected.

An additional object of the present invention is to improve the sealing joint between a sleeve and a respective pipe end.

Yet another object of the present invention is to prevent deformation in the walls of a pipe end during coupling of the latter to another pipe end.

2. Description and Advances of the Invention

In keeping with these objects and others will become apparent hereinafter, one feature of the invention resides, briefly stated, in a pipe coupling arrangement for connecting adjacent tubular pipe ends which comprises an elongated coupling sleeve having a longitudinal axis of symmetry, an interior passage for receiving pipe ends in generally aligned relationship, and a pair of exterior annular portions which are spaced axially apart for surrounding respective pipe ends. A continuously-converging, spiral-shaped channel is formed at each annular portion between each annular portion and a respective pipe end. A pair of spiral-shaped, split constrictable members are located in and are angularly movable through each respective channel, and each converges in radial thickness in smooth continuous manner from a trailing end region towards a separate leading end region as considered in the direction of movement through each channel. Each constrictable member has a generally circular in inner clamping portion surrounding the respective pipe end and is generally concentric with said axis. Constricting means are provided for angularly moving each constrictable member through each channel in direction from said trailing towards said leading end region, and for radially constricting each inner clamping portion about the entire periphery of each respective pipe end to thereby tightly clamp the same. The constricting means includes actuating members in force-transmitting relationship with each trailing end region for progressively urging each constrictable member in radially inward direction towards said axis to thereby engage the entire outer peripheries of the pipe ends between an initial unclamped position and a fully clamped position in which each leading end region is overlapped by each respective trailing end region.

In accordance with one preferred embodiment of the invention, the spiral-shaped channel is formed by a base wall on the sleeve itself. This base wall curves circumferentially and radially inwardly in progressive manner to thereby form the channel with a spiral-shaped configuration.

In accordance with another preferred embodiment of the invention, the spiral-shaped channel is formed by a circular base wall which is spaced at a uniform radial distance from the axis to thereby form a circular groove in the sleeve. A spiral-shaped insert is inserted in the groove. The insert has an inner wall which curves circumferentially and radially inwardly in progressive manner to thereby form each channel with a spiral-shaped configuration.

As for both embodiments, an improved and novel joint is established at each pipe end without risk of deforming the walls of the latter. The constricting means is operative for urging each constrictable member into sealing engagement with the entire outer peripheries of the pipe ends to thereby improve the sealing action at each joint. This sealing action is improved by forming each constrictable member as a circumferentially-incomplete or split member having a trailing end region and a separate leading end region. In the fully clamped position, the leading end region is overlapped by the trailing end region to improve the above-described sealing effect.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
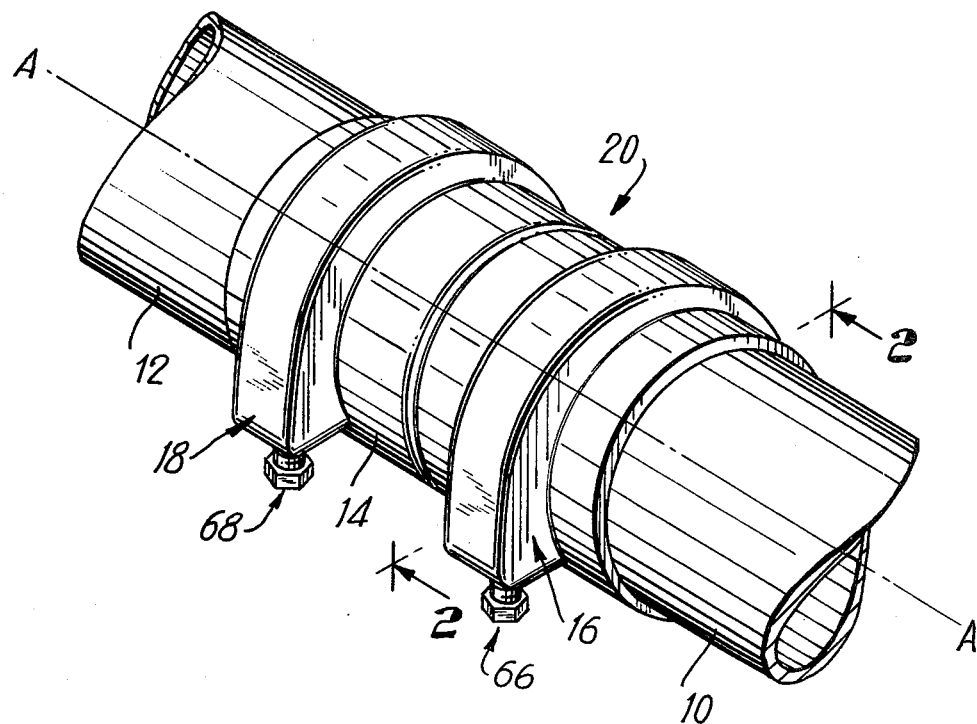
FIG. 1 is a broken-away perspective view of a preferred embodiment of the pipe coupling arrangement in accordance with the present invention.
Figure 2:
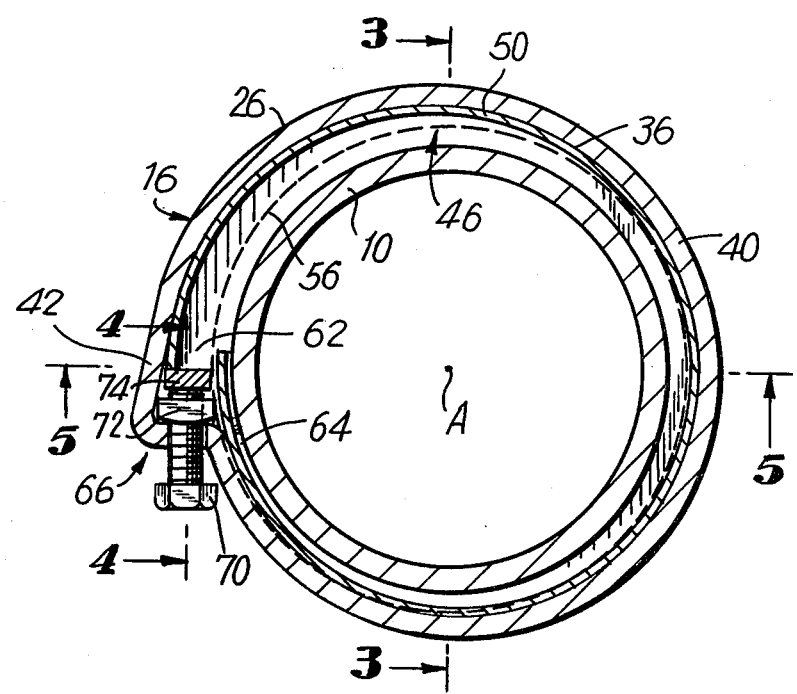
FIG. 2 is a sectional view taken along line 2—2 of FIG. 1.
Figure 3:
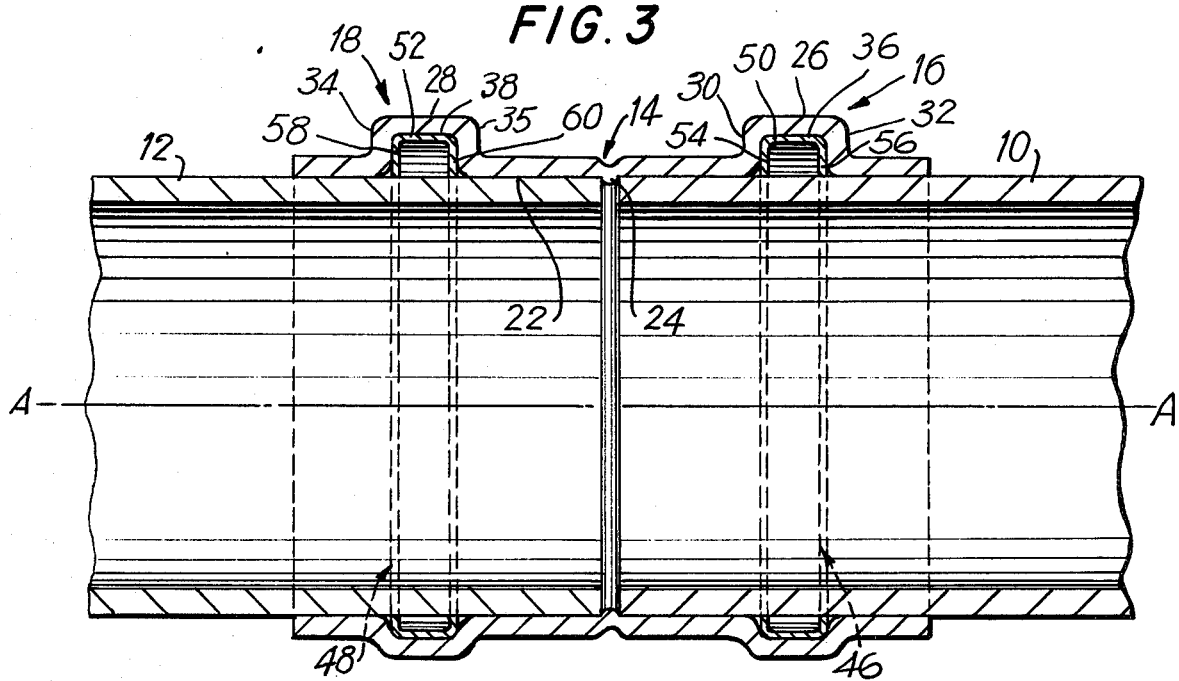
FIG. 3 is a sectional view taken along line 3—3 of FIG. 2.

Reference numerals 10 and 12 respectively identify two adjacent circular pipe ends to be connected together by the pipe coupling arrangement 20 of the present invention. Pipe ends 10, 12 are part of a pipeline which may be used for conveying any and all types of fluid or particulate solid media. The pipe coupling arrangement 20 of the preferred embodiment of FIGS. 1-5 includes an elongated coupling sleeve 14 having a longitudinal axis of symmetry A—A, and a pair of annular portions 16 and 18 which are spaced axially apart at opposite end regions of the sleeve to thereby surround the respective pipe ends 10, 12. As best shown in FIG. 3, sleeve 14 has an interior, axially-extending tubular passage 22 for receiving pipe ends 10, 12 in generally aligned relationship. The pipe ends 10, 12 may be inserted into opposite ends of the passage 22 into direct abutting relationship with each other or, as shown, an annular projection 24 extends radially inwardly of passage 22 at a central region of the sleeve and is operative for limiting the depth of insertion of the pipe ends as the latter are moved into respective engagement with the projection 24.

Annular portions 16, 18 have axially-extending base walls 26, 28 and, at opposite sides of the latter, a pair of opposite radially-extending side walls 30, 32 and 34, 35. Each base wall and its associated side walls together bound channels 36, 38 each having a U-shaped configuration. As exemplary shown in FIG. 2, base wall 26 curves circumferentially and radially inwardly in progressive manner about axis A—A to thereby form channel 36 with a spiral- or helical-shaped configuration. Inasmuch as pipe end 10 is generally circular, the radial height of side walls 30, 32 of channel 36 as measured between base wall 26 and the outer peripheral wall of pipe end 10 converges smoothly and continuously in circumferential clockwise direction about axis A—A. Put another way, as shown in FIG. 3, the radial distance between the upper portion of base wall 26 and axis A—A is larger than the corresponding radial distance between the lower portion of base wall 26 and axis A—A. Thus, annular portion 16 comprises a generally circular section 40 over the major portion of the circumference of the sleeve 14, and an extension section 42 which extends generally tangentially relative to section 40. The same structural configuration as described above in connection with annular portion 16 is also present for annular portion 18 and hence will not be repeated for the sake of brevity.

A pair of spiral-shaped, split (circumferentially-incomplete), clamping or constrictable members 46, 48 are located in and are angularly movable through channels 36, 38. Constrictable members 46, 48 have axially-extending base portions 50, 52 and, at opposite sides of the latter, a pair of opposite radially-extending side portions 54, 56 and 58, 60. Each base portion and its associated side portions together form a U-shaped configuration for each constrictable member. As exemplary shown in FIG. 2, base portion 50 curves circumferentially and radially inwardly in progressive manner about axis A—A to thereby form the constrictable member 46 with a spiral- or helical-shaped configuration. The side portions 54, 56 converge in radial height or thickness in smooth continuous manner in circumferential clockwise direction about axis A—A from a relatively larger trailing end region 62 towards a separate relatively smaller leading end region 64 as considered in the direction of movement of the constrictable emmber through its associated channel. Put another way, as shown in FIG. 3, the radial distance between the base portion 50 and axis A—A is larger at trailing end region 62 as compared to the corresponding radial distance between the base portion 50 and axis A—A at the leading end region 64. In short, constrictable member 46 has a generally circular inner clamping portion which surrounds the respective pipe end and which is also generally concentric with axis A—A.

Figure 5:
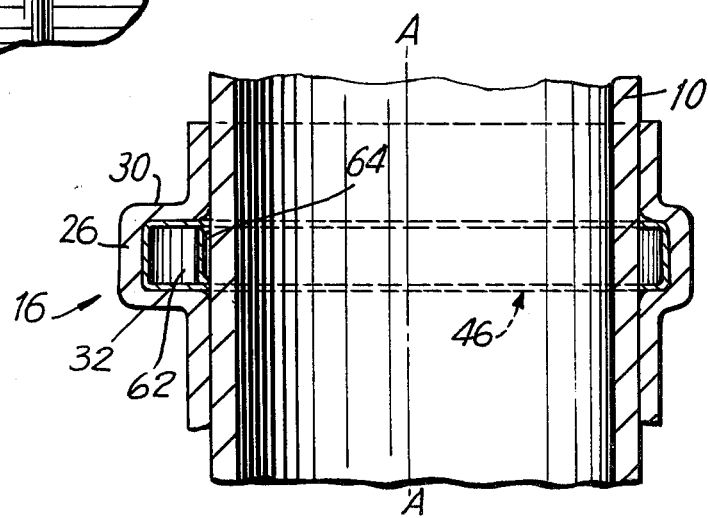
FIG. 5 is a sectional view taken along line 5—5 of FIG. 2.

As best shown in FIG. 5, leading end region 65 nests or is received within an access opening formed at the end face of trailing end region 62. Leading end region 64 is tapered such that the base wall 50 is smaller in width at the leading end region 64 as compared to its width at the trailing end region 62. As will be explained in greater detail below, the leading end region 64 passes through the open end of trailing end region 62 and is overlapped by the latter. FIG. 2 clearly shows this overlap wherein the constrictable member 46 extends over an arc of more than 360° and sealingly engages the entire outer periphery of pipe end 10. The same structural configuration as just described in connection with constrictable member 46 is present for constrictable member 48 and hence will not be repeated for the sake of brevity.

Figure 4:
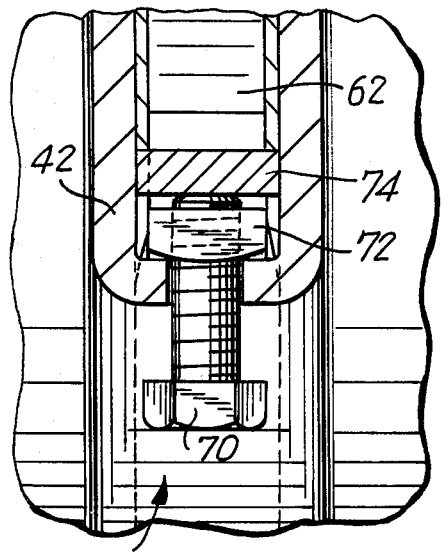
FIG. 4 is an enlarged sectional view taken along line 4—4 of FIG. 2.

Constricting means 66, 68 are operative for angularly moving each constrictable member through each respective channel in direction from the trailing towards the leading end regions thereof, and for radially constricting each inner clamping portion about the entire periphery of each respective pipe end to thereby tightly clamp the same. As best shown in FIGS. 2 and 4, the exemplary constricting means 66 includes a displacement member 70, and means 72 for mounting the latter on extension section 42 for displacement relative to the latter. Displacement member 70 is preferably a threaded element or screw, and mounting means 72 is preferably a threaded nut. The leading end face of screw 70 is in force-transmitting relationship with trailing end region 62, and may be in direct contact with the latter or, as shown, an abutment member 74 is located intermediate the leading end face of screw 70 and the trailing end region 62.

In use, one turns screw 70 in requisite direction and the advancing leading end pushes abutment member 74 and, in turn, urges spiral-shaped constrictable member 46 more fully into the spiral-shaped channel 36. The constrictable member 46 is simultaneously moved in circumferential clockwise direction and in radially inward direction to thereby sealingly engage the entire outer periphery of pipe end 10. Before screw 70 is turned, the constrictable member 46 does not affirmatively clamp or seal the pipe end 10. During further turning of screw 70, the constrictable member 46 is progressively turned and its grip is continuously tightened on the pipe end 10. After still further tightening of screw 70, the leading end region 64 passes through the open end of trailing end region 62 and is overlapped by the same. As shown in the fully clamped position of FIG. 2, the entire outer periphery of pipe end 10 is tightly sealed and clamped due to the wedging inter-engagement of constrictable member 46 and channel 36. A similar structural and functional arrangement and method of operation exists for constricting means 68 and hence will not be repeated for the sake of brevity.

Figure 6:
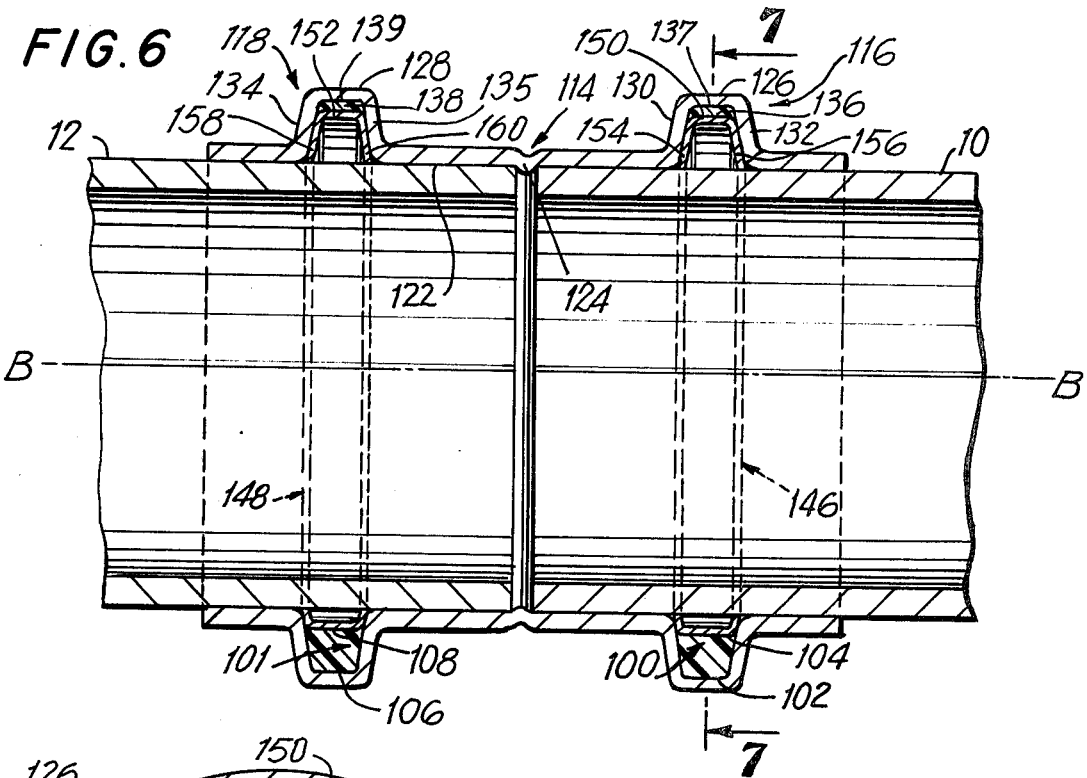
FIG. 6 is a sectional view analagous to FIG. 3 and shows another preferred embodiment of the pipe coupling arrangement in accordance with the present invention.
Figure 7:
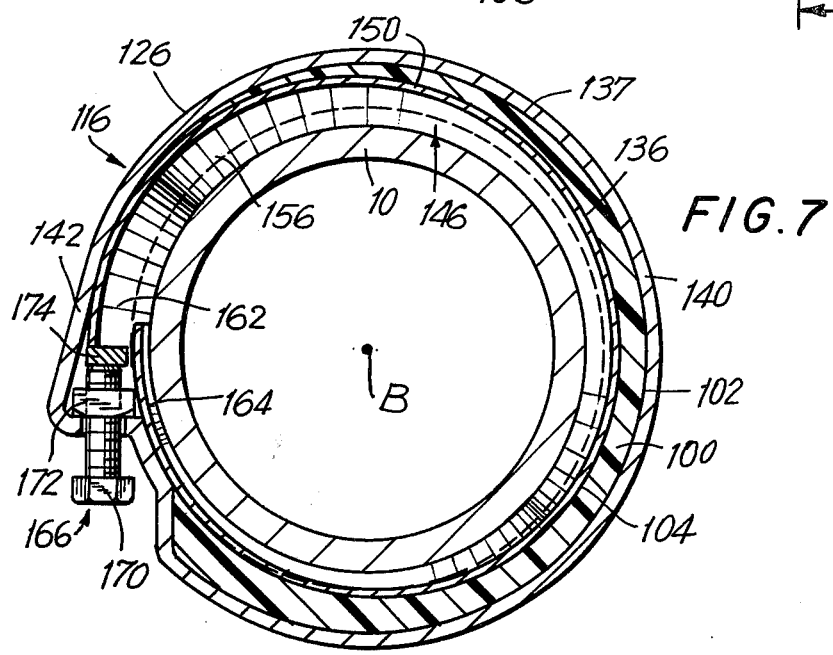
FIG. 7 is a sectional view taken along line 7—7 of FIG. 6.
Figure 8:
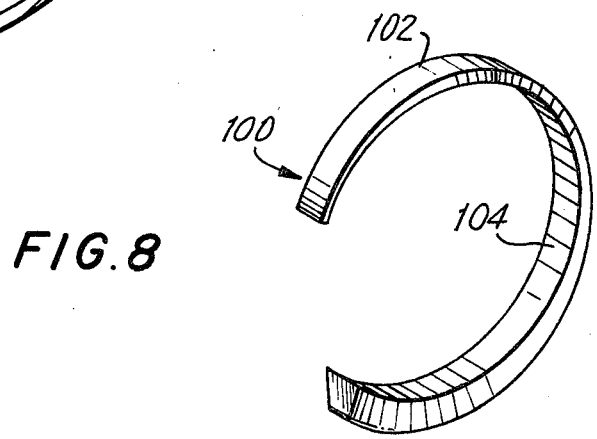
FIG. 8 is a perspective view of a detail of the embodiment of FIGS. 6 and 7.

Another embodiment of a preferred pipe coupling arrangement is shown in FIGS. 6–8 and includes an elongated coupling sleeve 114 having a longitudinal axis of symmetry B—B; constrictable members 146, 148; and constricting means 166, 168. As for sleeve 114, the structure and function of passage 122; annular projection 124; annular portions 116, 118; base walls 126, 128; side walls 130, 132 and 134, 135; channels 136, 138; circular section 140; and extension section 142 are generally similar to those described in connection with the first embodiment. As for constrictable members 146 and 148, the structure and function of base portions 150, 152; side portions 154, 156 and 158, 160; trailing end region 162; and leading end region 164 are generally similar to those already described in connection with the first embodiment. As for the constricting means, the structure and function of displacement member 170; mounting means 172; and abutment member 174 are again generally similar to those described in connection with the first embodiment. Hence, for the sake of brevity, it is not believed that a further detailed description of the above-identified parts is necessary, except to point out the following differences:

1. Each base wall 126, 128 and their respectively associated side walls 130, 132 and 134, 135 bound circular grooves 137, 139 each having a U-shaped configuration. As best shown in FIG. 7, base wall 126 curves circumferentially about axis B—B to thereby form groove 137 with a generally circular configuration over the major portion of the circumference of the sleeve. Put another way, base wall 126 is spaced radially outwardly relative to axis B—B at a substantially uniform distance over its major extent.

2. In order to form the spiral-shaped channels 136, 138 intermediate each annular portion and the respective pipe ends, a split (circumferentially-incomplete) wedge-shaped insert 100 or 101 are located in each circular groove. As best shown in FIGS. 7 and 8, insert 100 has an outer circular wall 102 generally concentric with axis B—B and an inner wall 104 which curves circumferentially and radially inwardly in progressive manner to thereby form each channel with a spiral- or helical-shaped configuration. In similar manner, insert 101 has an outer circular wall 106 and an inner wall 108.

In use, one turns screw 70 in requisite direction and the advancing leading end pushes abutment member 174 and, in turn, urges spiral-shaped constrictable member 146 more fully into the spiral-shaped channel 136. The constrictable member 146 slides and bears against inner wall 104 and is simultaneously moved in circumferential clockwise direction and in radially inward direction to thereby sealingly engage the entire outer periphery of pipe end 10. Before screw 170 is turned, the constrictable member 146 does not affirmatively clamp the pipe end 10. During further turning of screw 170, the constrictable member 146 is progressively turned and its grip is continuously tightened on the pipe end 10. After still further tightening of screw 170, the leading end region 164 passes through the open end of trailing end region 162 and is overlapped by the same. As shown in the fully clamped position of FIG. 7, the entire outer periphery of pipe end 10 is tightly sealed and clamped due to the wedging inter-engagement of spiral-shaped constrictable member 146 and spiral-shaped channel 136.

The embodiment of FIGS. 6–8 is currently preferred over the embodiment of FIGS. 1–5 because it has proven to be simpler and less expensive to machine a circular groove, rather than a spiral-shaped channel. Furthermore, the inserts 100, 101 of the embodiment of FIGS. 6–8 are preferably constituted by a friction-reducing material such as synthetic plastic material just to mention a preferred possibility. This latter feature facilitates the movement of the constrictable members through the spiral-shaped channels.

It will be understood that each of the elements described above, or two or more together, may also find a useful application in other types of constructions differing from the types described above.

While the invention has been illustrated and described as embodied in a pipe coupling arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A pipe coupling arrangement for connecting adjacent tubular pipe ends, comprising
   (a) an elongated coupling sleeve having a longitudinal axis of symmetry, an interior passage for receiving pipe ends in generally aligned relationship, and a pair of exterior annular portions which are spaced axially apart for surrounding respective pipe ends;
   (b) wall means at each annular portion for forming about the latter a continuously converging, spiral-shaped channel between each annular portion and the respective pipe end;
   (c) a pair of spiral-shaped, circumferentially-incomplete constrictable members in and angularly movable through each respective channel and each converging in radial thickness in smooth continuous manner from a trailing end region towards a separate leading end region as considered in the direction of movement through each channel, each constrictable member having an elongated generally circular inner clamping portion surrounding the respective pipe end and being generally concentric with said axis; and (d) constricting means for angularly moving each constrictable member through each channel in direction from said trailing towards said leading end region, and for circumferentially constricting in radial direction each inner clamping portion along the entire length of the latter about the entire periphery of each respective pipe end to thereby tightly clamp the same, including actuating members in force-transmitting relationship with each trailing end region for progressively urging all points on the circumference of each generally circular inner clamping portion in radially inward direction towards said axis to thereby engage the entire outer peripheries of the pipe ends between an initial unclamped position in which each generally circular inner clamping portion has a diameter of predetermined dimension, a plurality of successive intermediate positions in which the successive diameters of each generally circular inner clamping portion are successively smaller than said predetermined dimension, and a fully clamped position in which the diameter of each generally circular inner clamping portion is the smallest of all the aforementioned diameters, each leading end region being overlapped by each respective trailing end region in said fully clamped position to thereby uniformly envelop the pipe ends in a seal-tight and non-deforming manner.

2. The arrangement as defined in claim 1; and further comprising means for limiting the depth of insertion of the pipe ends into said interior passage of said sleeve, including an annular projection extending radially inwardly of said passage at a region intermediate the opposite ends of said sleeve.

3. The arrangement as defined in claim 1, wherein each annular portion has a generally circular section, and an extension section which extends generally tangentially outwardly of said circular section; and wherein said constricting means is mounted on said extension section.

4. The arrangement as defined in claim 1, wherein said wall means includes a base wall and a pair of side walls at opposite sides of said base wall to thereby form each channel with a U-shaped configuration.

5. The arrangement as defined in claim 4, wherein each base wall is spaced radially outwardly from said axis at a relatively larger radial distance at said trailing end region, and at a relatively smaller radial distance at said leading end region; and wherein each base wall curves circumferentially and radially inwardly in progressive manner to thereby form each channel with a spiral-shaped configuration.

6. The arrangement as defined in claim 1, wherein each annular portion has a base wall and a pair of side walls at opposite sides of said base wall to thereby form an annular groove with a U-shaped configuration.

7. The arrangement as defined in claim 6, wherein each base wall is spaced radially outwardly from said axis at a substantially uniform radial distance over the major circumferential portion of said sleeve; and wherein each base wall curves about said axis to thereby form each groove with a substantially circular configuration.

8. The arrangement as defined claim 7; and further comprising a split insert receivable in each groove, said insert having an outer sleeve-bearing wall generally circularly concentric with said axis, and an inner constrictable member-bearing wall which curves circumferentially and radially inwardly in progressive manner to thereby form each channel with a spiral-shaped configuration.

9. The arrangement as defined claim 8, wherein said insert is constituted by friction-reducing material.

10. The arrangement as defined claim 1, wherein each constrictable member includes a base portion and a pair of side portions at opposite sides of said base portion to thereby form each constrictable member with a U-shaped configuration.

11. The arrangement as defined claim 10, wherein each trailing end region has an access opening; and wherein each base portion at each leading end region of said constrictable member has a relatively smaller width dimension as considered in axial direction as compared to the corresponding width dimension of each base portion at each trailing end region to thereby permit said leading end region to pass through each access opening and nest in overlapping relationship within said trailing end region.

12. The arrangement as defined claim 1, wherein each constrictable member has a circumferential length dimension which extends over an arc of more than 360°.

13. The arrangement as defined claim 1, wherein said actuating members includes a displaceable member and means for mounting said displaceable member on said sleeve for displacement relative to the latter.

14. The arrangement as defined claim 13, wherein said displaceable member is a threaded element, and wherein said mounting means is a threaded nut in threaded engagement with said element.

15. The arrangement as defined claim 13; and further comprising an abutment member intermediate said displaceable member and said constrictable member.

16. A pipe coupling arrangement for connecting adjacent tubular pipe ends, comprising (a) an elongated coupling sleeve having a longitudinal axis of symmetry, an interior passage for receiving pipe ends in generally aligned relationship, and a pair of exterior annular portions which are spaced axially apart for surrounding respective pipe ends, each annular portion having a base wall and a pair of side walls which together with said base wall form a substantially circular groove which is generally concentric with said axis;

(b) wall means at each annular portion for forming about the latter a continuously converging channel, including a circumferentially-incomplete insert receivable in each groove, each insert having an outer sleeve-bearing wall which is generally concentric with said axis and which frictionally engages the respectively associated base wall, and each insert having an inner wall which curves circumferentially and radially inwardly in continuous manner relative to said axis to thereby form each channel with a spiral-shaped configuration between each annular portion and the respective pipe end;

(c) a pair of spiral-shaped, circumferentially-incomplete constrictable members, each being mounted in sliding engagement with a respective inner wall of the associated insert for angular movement through each respective channel, each constrictable member converging in radial thickness in smooth continuous manner from a trailing end region towards a separate leading end region as considered in the direction of movement through each channel, and each constrictable member having an elongated generally circular inner clamping portion surrounding the respective pipe end and being generally concentric with said axis; and (d) constricting means for angularly moving each constrictable member relative to its associated insert through each channel in direction from said trailing towards said leading end region, and for circumferentially constricting in radial direction each inner clamping portion along the entire length of the latter about the entire periphery of each respective pipe end to thereby tightly clamp the same, including actuating members in force-transmitting relationship with each trailing end region for progressively urging all points on the circumference of each generally circular inner clamping portion in radially inward direction towards said axis to thereby engage the entire outer peripheries of the pipe ends between an initial unclamped position in which each generally circular inner clamping portion has a diameter of predetermined dimension, a plurality of successive intermediate positions in which the successive diameters of each generally circular inner clamping portion are successively smaller than said predetermined dimension, and a fully clamped position in which the diameter of each generally circular inner clamping portion is the smallest of all the aforementioned diameters, each leading end region being overlapped by each respective trailing end region in said fully clamped position to thereby uniformly envelop the pipe ends in a seal-tight and non-deforming manner.

* * * * *